United States Patent [19]

Liew

[11] Patent Number: 5,291,477

[45] Date of Patent: Mar. 1, 1994

[54] METHOD AND SYSTEM FOR MULTICAST ROUTING IN AN ATM NETWORK

[75] Inventor: Soung C. Liew, Somerset, N.J.

[73] Assignee: Bell Communications Research, Inc., Livingston, N.J.

[21] Appl. No.: 927,761

[22] Filed: Aug. 10, 1992

[51] Int. Cl.⁵ .................. H04L 12/48; H04Q 11/04
[52] U.S. Cl. ........................... 370/54; 370/60; 370/60.1; 370/94.1; 370/94.3; 370/58.1; 340/825.02; 340/825.03
[58] Field of Search ............. 370/60, 60.1, 94.1, 370/94.2, 94.3, 95.1, 95.3, 54, 58.1, 58.2, 58.3; 340/825.02, 825.03, 826, 827

[56] References Cited

U.S. PATENT DOCUMENTS

| | | | |
|---|---|---|---|
| 4,771,424 | 9/1988 | Suzuki et al. | 370/60.1 |
| 5,067,127 | 11/1991 | Ochiai | 370/95.1 |
| 5,117,422 | 5/1992 | Hauptschein et al. | 370/95.1 |
| 5,142,531 | 8/1992 | Kirby | 370/94.3 |
| 5,170,393 | 12/1992 | Peterson et al. | 370/94.1 |

OTHER PUBLICATIONS

Alain Alcouffe & Giles Muratet, "Optimal Location of Plants", Management Science, vol. 23, No. 3, Nov., 1976, pp. 267-274.

Riccardo Melen & Jonathan S. Turner, "Nonblocking Network for Fast Packet Switching", Computer & Communications Research Center, Washington Univ., St. Louis, 1989 IEEE CH2702-9/89/0000/0548, pp. 548-557.

Hiroshi Suzuki, Kiroshi Nagana, Toshio Suzuki, Takao Takeuchi, Susumu Iwasaki, "Output-buffer Switch Architecture for Asynchronous Transfer Mode"IEEE International Conf. on Communications, Jun. 11-14, 1989, pp. 99-103.

Primary Examiner—Wellington Chin
Attorney, Agent, or Firm—Leonard Charles Suchyta; Joseph Giordano

[57] ABSTRACT

Method and system for multicast routing in an ATM network including a multicast tree having a plurality of nodes interconnected by links wherein a weight representative of traffic congestion level is assigned to each link and at least one algorithm is utilized to find routes from a source node of the tree to multiple end nodes of the tree which minimize the sum-total of link weights. The method and system are disclosed with a 3-stage Clos switching network. One optimal and two heuristic algorithms are disclosed. The heuristic algorithms can find multicast routes that are close to optimal within a response time that is significantly lower than that of the optimal algorithm. A hybrid implementation in which the optimal and heuristic algorithms are run in parallel with a set time limit is also disclosed. Although the method and system are disclosed with the Clos switching network, the algorithms also apply to communications networks with a two-hop structure.

14 Claims, 9 Drawing Sheets multicast tree after trim-and-graft operation

Arc cost in full graph

Shortest-path solution
(cost of individual paths to end nodes are minimized)

Steiner-tree solution
(sum of all arc cost in multicast tree is minimized)

arc cost in full graph multicast tree after search for shortest-path tree multicast tree after optimization based on V multicast tree after trim-and-graft operation

- •   Individual execution time of optimal algorithm
- ○   Individual execution time of heuristic algorithm 1
- ——— Average execution time
- - - - - Average heuristic-to-optimal cost ratio of heuristic algorithm 1

- •   Individual execution time of optimal algorithm
- ○   Individual execution time of heuristic algorithm 1
- ———  Average execution time
- - - - -  Average heuristic-to-optimal cost ratio of heuristic algorithm 1

○ Individual cost ratio of heuristic algorithm 1
● Individual cost ratio of heuristic algorithm 2
----- Average cost ratio of heuristic algorithm 1
——— Average cost ratio of heuristic algorithm 2

○     Individual cost ratio of heuristic algorithm 1
●     Individual cost ratio of heuristic algorithm 2
- - - - - Average cost ratio of heuristic algorithm 1
———— Average cost ratio of heuristic algorithm 2

METHOD AND SYSTEM FOR MULTICAST ROUTING IN AN ATM NETWORK

TECHNICAL FIELD

This invention relates to methods and systems for routing in an ATM network and, in particular, to methods and systems for determining optimal multicast routes in an ATM network.

BACKGROUND ART

Asynchronous Transfer Mode (ATM) has emerged as a very promising transport technique for supporting services of diverse bit-rate and performance requirements in future broadband networks. High-speed packet switches are essential elements for successful implementation of ATM networks. If a significant population of network users are potential broadband-service subscribers, high-capacity packet switches with a large number of input and output ports are required.

Two basic approaches in large packet switch designs emerge as a result of recent research activities. Both approaches concentrate on scalable designs that construct a large switch using smaller switch modules. The first approach strives to avoid internal buffering of packets in order to simplify traffic management. Examples in this category are the Modular switch, the generalized Knockout switch, and the 3-stage generalized dilated-banyan switch (with no buffering at the center stage).

The second approach attempts to build a large switch by simply interconnecting switch modules as nodes in a regularly-structured network, with each switch module having its own buffer for temporary storage of packets. A notable example in this category is illustrated in FIG. 1a and described in the article by H. Suzuki, H. Hagano, T. Suzuki, T. Takeuchi, and S. Iwasaki, "Output-Buffer Switch Architecture For Asynchronous Transfer Mode," CONF. RECORD, IEEE ICC '89, pp. 99–103, June 1989. As described in the article and as illustrated in FIG. 1a, output-buffered switch modules 10 are connected together as in the 3-stage Clos circuit-switch architectures. The switch modules 10 have internal buffers 12 at their outputs. Typically, a packet must pass through several queues before reaching its desired output in these switch architectures.

Because of the simplicity of switches in the second approach, they have been the potential focus of several switch vendors. However, these switches necessitate more complicated network control mechanisms, since more queues must be managed. In addition, for the Clos architecture, routing within the switching network becomes an issue because there are multiple paths from any input port to any output port as illustrated in FIG. 1b.

Things become even more complicated if multicast (point-to-multipoint) connections, an important class of future broadband services, are to be supported. For communications networks that use these switching networks for switching in their nodes, each node should be treated as a "micronetwork" rather than an abstract entity with queues at the output links only, as is done traditionally. Internal and output buffers 14 are provided as illustrated in FIG. 1b.

An open question is to what extent the internal buffers in the micronetwork would complicate traffic management and whether routing algorithms for call setups would require unacceptably long execution times. It is assumed that all switch modules in the micronetwork have multicast capability. The multicast routing problem in a 3-stage Clos switching network can be compared with the multicast routing problem in a general network. Three features associated with routing in the Clos network are:

1 Necessity for a very fast setup algorithm;
2. Large numbers of switch modules and links; and
3. Regularity and symmetry of the network topology.

It is necessary to have an algorithm that is faster and more efficient that those used in a general network because the Clos switching network is only a subnetwork within a overall communications network.

From the viewpoint of the overall network, the algorithm performed at each Clos switching network is only part of the whole routing algorithm. Adding to the complexity is the highly connected structure of the Clos network, which dictates the examination of a large number of different routing alternatives. The Clos network is stage-wise fully connected in that each switch module is connected to all other switch modules at the adjacent stage.

As an example, for a modest Clos network with 1024 input and output ports made of 32 inputs $\times$ 32 outputs switch modules (with $n=32$, $m=32$, $p=32$ as illustrated in FIG. 1a), the numbers of nodes and links are 96 and 3072, respectively. Thus, algorithms tailored for a general network are likely to run longer than the allotted call-setup time. Both features 1 and 2 above argue for the need for a more efficient algorithm, and feature 3, regularity of the network topology, may lend itself to such an algorithm.

In the article entitled "Nonblocking Networks for Fast Packet Switching" CONF. RECORD, IEEE IN-FOCOM '89, pp. 548–557, April 1989, by R. Melen and J. S. Turner, the relationship between various switch parameters that guarantee an ATM Clos network to be nonblocking are derived. In the ATM setting, each input and output link in a switch contains traffic originating from different connections with varying bandwidth requirements.

An ATM switch is said to be nonblocking if a connection request can find a path from its input to its targeted output and the bandwidth required by the connection does not exceed the remaining bandwidths on both the input and output. What was not addressed in Melen and Turner is the issue of routing. Even though the switch used may be nonblocking as defined, a connection may still suffer unacceptable performance in terms of delay and packet loss if the wrong path is chosen. This is due to contention among packets for common routes in the ATM setting where packet arrivals on different inputs are not coordinated. Consequently, regardless of whether the switch is nonblocking, some routes will be preferable because they are less congested.

SUMMARY OF THE INVENTION

An object of the present invention is to provide method and system for multicast routing in an ATM network to ensure cost-effective, high quality multicast services such as teleconferencing, video-on-demand, etc. for the duration of the service.

Another object of the present invention is to provide method and apparatus for multicast routing in an ATM network to facilitate quick call setups without sacrificing the quality of service for calls.

In carrying out the above objects and other objects of the present invention, a method is provided for determining optimal routes in a network including a multicast tree. The tree includes a plurality of nodes interconnected by links. The plurality of nodes includes a source node, multiple end nodes and multiple intermediate nodes. The method finds optimal routes from the source node to the multiple end nodes. The method includes the step of assigning a weight to each link in the tree. The weight is representative of a traffic congestion level on each link. The method also includes the step of minimizing the sum-total of link weights from the source node to the multiple end nodes to determine the optimal routes.

In one embodiment, the step of minimizing is at least partially accomplished by an optimal algorithm which utilizes a "trimming" procedure.

Preferably, the step of minimizing is at least partially accomplished by two heuristic algorithms which restrict the solution to a subset of all possible solutions.

A system is also provided for carrying out each of the above method steps.

The method and system can be applied to two areas: 1) Future communications networks that use cross-connects to configure ATM networks into simple two-hop logical structures; this could be done, for instance, to facilitate network control and increase network reliability; and 2) Future ATM switching networks (i.e., micronetworks within a switching node). Several switch manufacturers have adopted the 3-stage Clos network, a two-hop network, as the way to scale their ATM switches. The proposed routing methodology ensures efficient use of the switching and transmission resources in communications networks. It also guarantees grades of service superior to those in a network without a well-thought-out routing scheme. The remainder of the specification concentrates on the second application, although the invention readily extends to any communications networks with two-hop, or a combination of one-hop and two-hop, structures.

The optimal algorithm uses a "trimming" procedure to eliminate a majority of the nonoptimal alternatives from consideration, thus saving a substantial amount of run time. The found solution is guaranteed to be the best solution. The two heuristic algorithms reduce the run time further by judiciously restricting the solution to a subset of all possible solutions. Although the solutions given are not necessarily the best, they are generally acceptable from an engineering viewpoint.

The first heuristic algorithm consists of three steps, with each step attempting to improve on the solution found by the preceding step. The second heuristic algorithm is a modification of the optimal algorithm in which the intermediate nodes in the multicast tree are restricted to a subset of all available intermediate nodes.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 2a through 2c are schematic diagrams illustrating costs for various paths wherein FIG. 2b illustrates a shortest-path solution and FIG. 2c illustrates a Steiner-tree solution;

BEST MODE FOR CARRYING OUT THE INVENTION

Figure 1A:
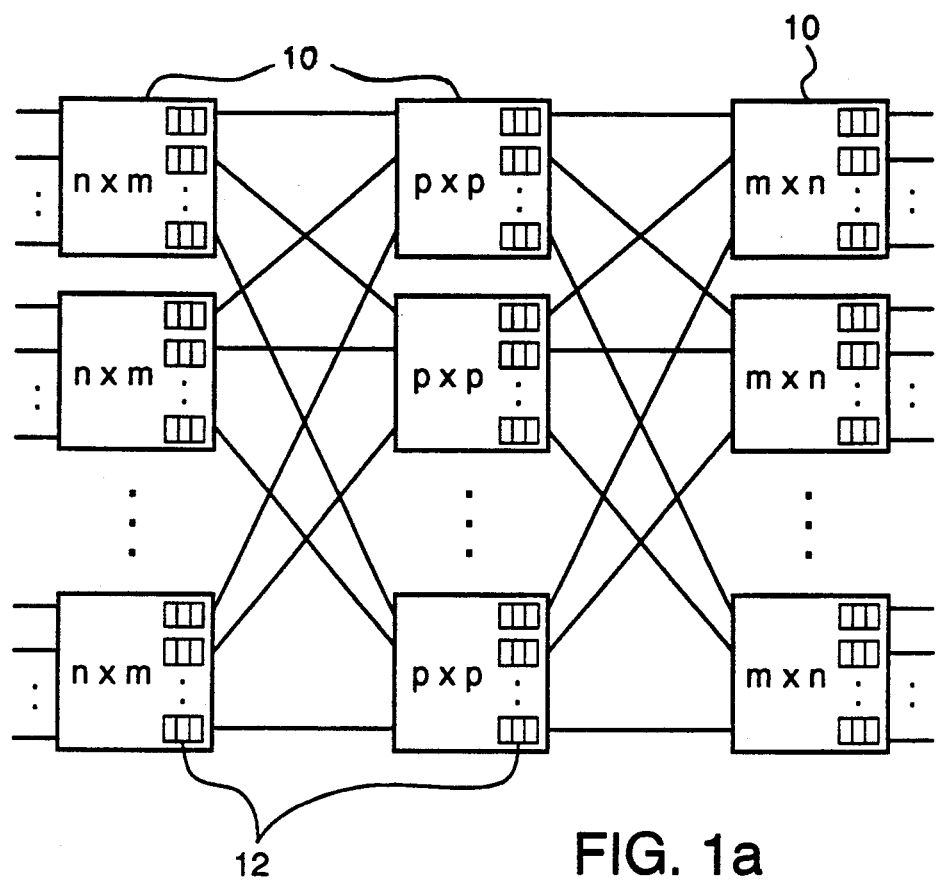
FIG. 1a is a schematic block diagram view illustrating a 3-stage Clos switching network having internal buffers at outputs of switch modules.
Figure 1B:
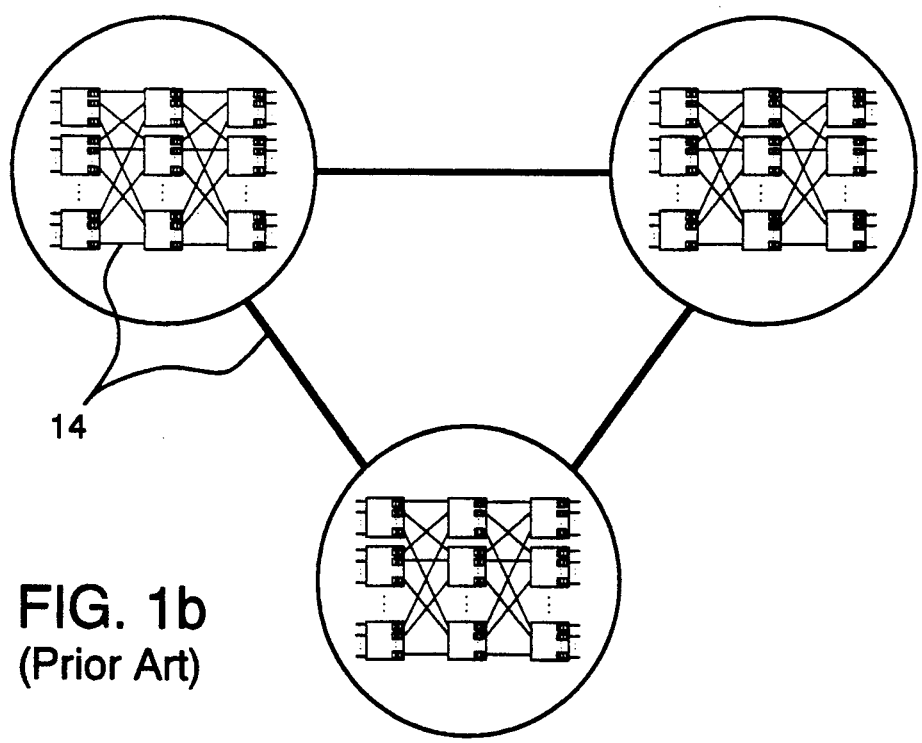
FIG. 1b is a schematic view illustrating Clos switches as micronetworks within a communications network and having internal and output buffers.

In general, the remainder of the specification is organized as follows. The section entitled "Assumptions" there is discussed the specific problem formulation and definition with respect to other possibilities. Appendix 1 formulates the multicast routing problem in terms of the so-called warehouse location problem, thus showing that it is unlikely that an efficient optimal algorithm can be found for the routing problem, since the warehouse location problem is known to be a hard problem.

The section entitled "Algorithms For Multicast Routing In The Clos Network" presents the designs of an optimal and two heuristic algorithms, with the details of the recursive optimal algorithm given in Appendix 2.

The section entitled "Computation Results" shows that the heuristic algorithms can have much faster response time than the optimal algorithm while achieving near-optimal routing. Implications of the results for actual real-time implementation of the routing schemes in switching networks are also discussed. Finally, the main results and conclusions are summarized in the section entitled "Conclusions."

Assumptions

Routing in any network of switch modules can be posed as a graph problem in which the switch modules correspond to nodes and the links correspond to directed arcs in the graph. A weight is assigned to each arc, and its value corresponds to the congestion level on the associated link. For instance, the weight assigned could be traffic load, packet mean delay, packet loss rate, mean buffer occupancy, or other traffic measures. Alternatively, it could be a weighted function of all these parameters. In either case, the weight of an arc corresponds to the "undesirability" of choosing the arc as part of the overall route. One may argue that more than one parameter is needed to capture the traffic characteristics on each link. Although such "multi-objective optimization" problem is not described in detail in this application, the treatment here provides a basis for extension along this line.

It is also assumed that the undesirability of a route is the sum of all the weights of the arcs in the route. For instance, if the weights are taken to be the mean delays of the links, this approach aims to minimize the mean delay of the overall route. As far as point-to-point connections are concerned, the routing problem in this formulation becomes a shortest-path routing problem.

It is well known that there are good algorithms that can solve this problem within a short time.

The situation is not as clear-cut in multicast routing, which involves multiple paths from one source to several destinations. If we aim to optimize the local performance or grade-of-service perceived by each path, then the shortest-path formulation is still valid, simply because this approach assigns the least congested path to each input-output pair.

On the other hand, if we aim to minimize the global congestion level (e.g., the total buffer occupancies of all queues) of the overall switching network, then we are faced with a Steiner-tree problem, in which the sum-total of the weights of all the arcs in the multicast connection is to be optimized. The solutions given by taking these two different perspectives are different, as is shown in the example of FIGS. 2a-c, where multicast routing from node i at the first stage to nodes 0, 1, and 2 at the third stage are considered.

Figure 2A:
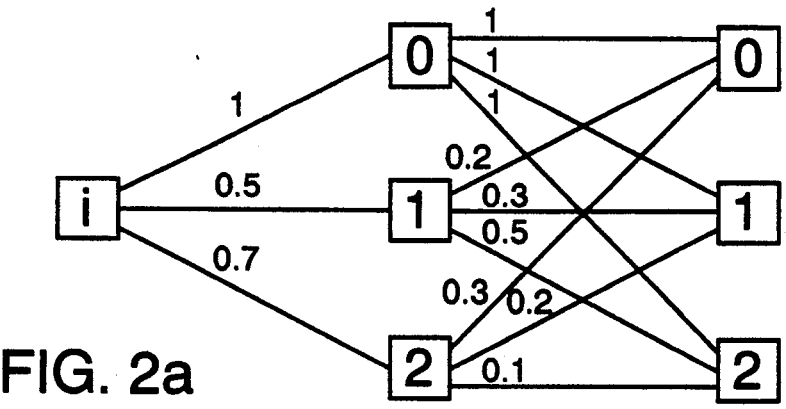
Figure 2B:
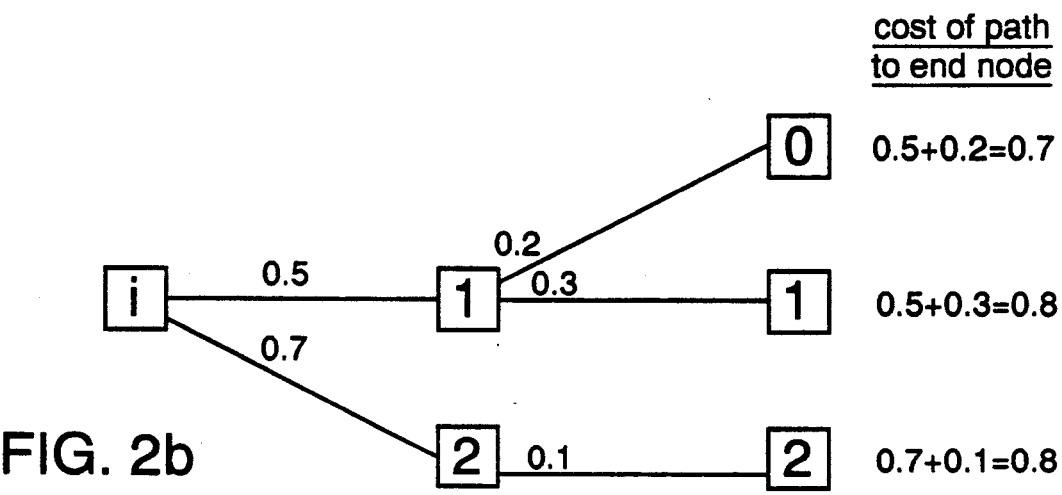
Figure 2C:
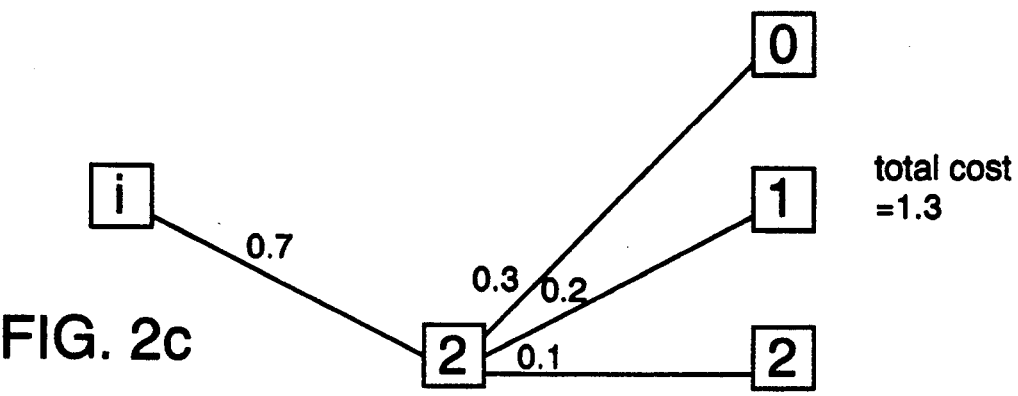

In FIG. 2a, there is illustrated the arc cost in full graph. FIG. 2b illustrates a shortest-path solution where the costs of individual paths to end nodes are minimized. FIG. 2c illustrates a Steiner-tree solution where the sum of all arc cost in the multicast tree is minimized.

The global viewpoint has the advantage that it can accommodate more connection requests and that it reserves more capacity for future connection requests. Unfortunately, the general Steiner-tree problem is a hard problem without a known fast algorithm. In Appendix 1, it is shown that the two-hop structure of the Clos Network allows one to pose the multicast routing problem as a warehouse location problem. Although this problem is simpler than the Steiner-tree problem, it is still a hard problem if one aims for the optimal solution. Therefore, a heuristic algorithm that finds a close-to-optimal solution within a short time is desirable. The next section considers optimal as well as heuristic routing algorithms.

Algorithms For Multicast Routing In The Clos Network

Figure 3:
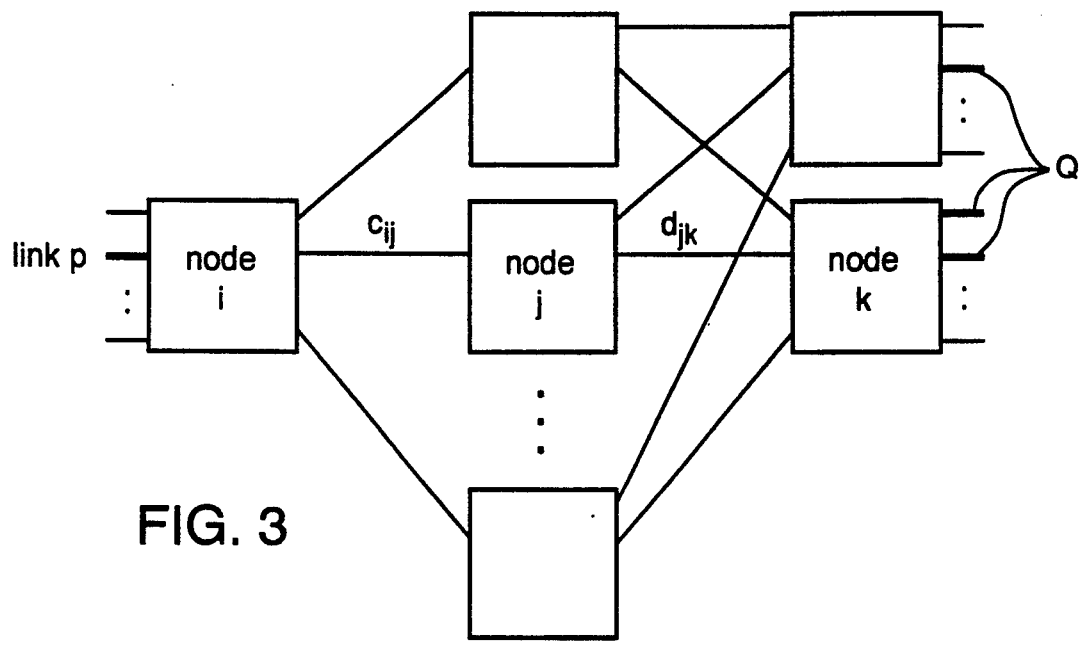
FIG. 3 is a schematic diagram illustrating a multicast connection.

Suppose one labels the three sets of nodes in stage 1, stage 2, and stage 3 of a Clos network as I, J, and K, respectively. As illustrated in FIG. 3, the weight of an arc from node $i \in I$ to node $j \in J$ is denoted by $c_{ij}$, and that from node $j \in J$ to node $k \in K$ by $d_{jk}$.

Suppose that one wants to multicast from input link p (of switch module i) to the set of output links Q (of switch modules $K' \in K$). Then, the problem is basically to select a set of second-stage switch modules $J' \in J$ to be included in the multicast tree. If we only knew the second-stage nodes $J'$ that are used in the optimal multicast tree, then the links in the tree can be easily found using the minimal-link selection process below:

Minimal-link Selection Process based on Node Set $J'$

1. The links from node i to all $j \in J'$ are included.
2. In addition to these links, for each third-stage node $k \in K'$, the minimal link $(j_k, k)$ is chosen for connection from the second stage to node k; i.e., the second-stage node $j_k$ chosen for the connection is such that $j_k \in J'$ and $$d_{j_k k} \leq d_{jk} \text{ for all } j \in J'.$$

The problem, of course, is that one does not know the second-stage nodes used in the optimal multicast tree, and finding them is not easy.

Given a subset of second-stage switch modules that is proposed for use as intermediate nodes, not necessarily those used in the optimal solution, one can easily compute the best solution based on that proposal using the minimal-link selection process described above. If $m \leq |K'|$, there are $2^m - 1$ possible proposals, ranging from those with only one intermediate module to that with all m intermediate modules. If $m > |K'|$, there are $$\sum_{i=1}^{|K'|} \binom{m}{i}$$

possible proposals, ranging from those with one intermediate module to those with $|K'|$ intermediate modules; proposals with more than $|K'|$ intermediate modules need not be considered because at most $|K'|$ intermediate modules will be used in any multicast tree. Thus, there are $$\min\left(2^m - 1, \sum_{i=1}^{|K'|} \binom{m}{i}\right)$$

possible proposals. A brute-force method for the overall algorithm is to go through all the proposals, calculate the best solution associated with each proposal, and choose the one with the lowest cost. With this exhaustive enumeration method, the run time of the algorithm grows exponentially with m. Assuming $m \leq |K'|$ and a modest m value of 32, for instance, there are more than four billion proposals that must be considered. Fortunately, there are ways to eliminate some of the non-optimal alternatives without computing their solutions. The paper entitled "Optimal Location of Plants" by A. Alcouffe and G. Muratet in MANAGEMENT SCIENCE, Vol. 23, pp. 267–274, Nov. 1976 provides one such algorithm. However, the algorithm presented hereinbelow is more efficient because it can eliminate more non-optimal alternatives at the outset.

Figure 4:
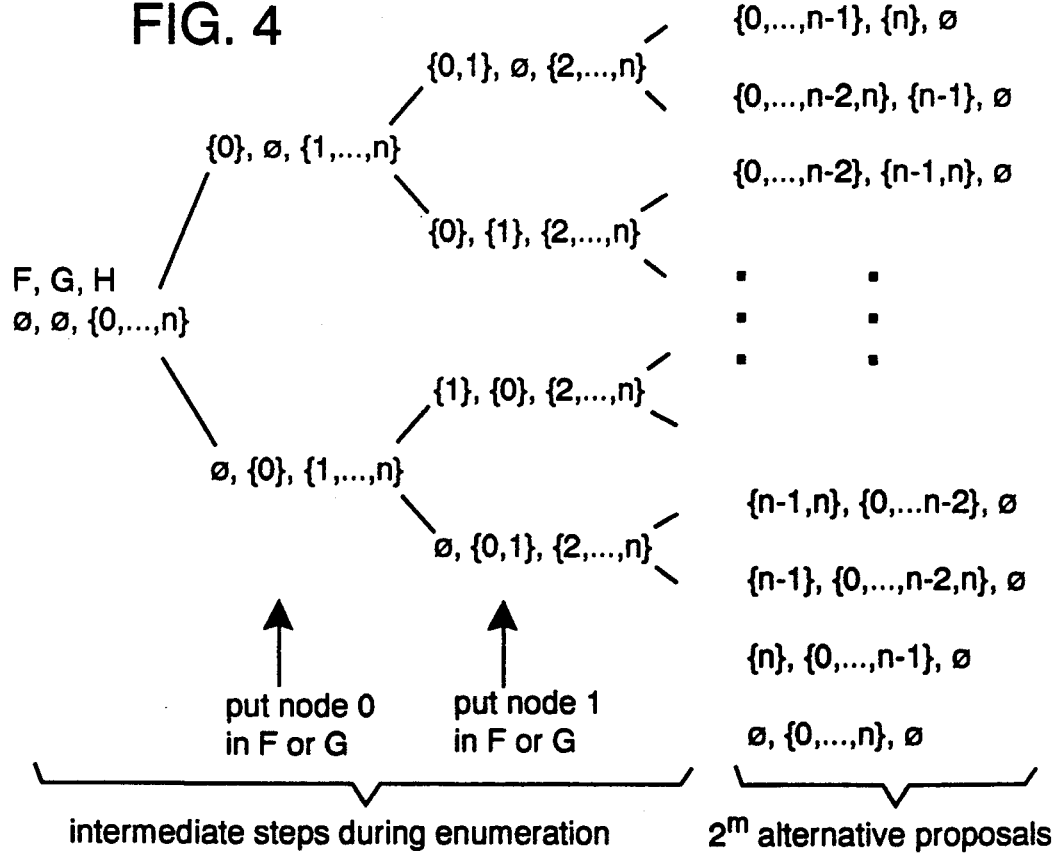
FIG. 4 is a schematic view of an enumeration tree having nodes F, G and H for listing alternative solutions.

To understand the present algorithm, for simplicity, one considers all the $2^m$ subsets of intermediate nodes and attempts to devise a method for enumerating the proposals. The fact that some of the proposals need not be considered will be taken into account below to further improve the algorithm. FIG. 4 shows one possible enumeration scheme depicted as a tree in which the leaf nodes on the right are the $2^m$ alternative proposals. Each node in the enumeration tree, whether it is a leaf node or not, is represented by three disjoint subsets of intermediate switch modules, F, G, and H. F denotes the proposed second-stage switch modules, G denotes the excluded switch modules, and H denotes the switch modules that have neither been proposed nor excluded so far in the enumeration process. The enumeration process starts with the root node on the left with all modules being in H originally. At each node of the enumeration tree, a new module is taken from H, add the tree branches off in two directions with the chosen module being assigned to F and G, respectively. After m levels of branching, one ends up with each module either being assigned to F or G for the $2^m$ leaf nodes, thus completing the enumeration process.

The basis of the present multicast routing algorithm is as follows: If one can determine during the enumeration process that the best solution given by the leaf nodes of one branch is inferior to the solution given by some leaf node of the other branch, then one needs to branch in the latter direction only, since the former direction will not yield the optimal solution anyway. This can potentially save a lot of computation. In the following, a theorem is adapted from the article "Optimal Location of Plants", noted above, for such a trimming process.

Let C(F) be the cost of the particular solution with node set F being the proposed intermediate nodes. Specifically, $$C(F) = \sum_{j \in F} c_{ij} + \sum_{k \in K'} d_{j_k k} \quad (1)$$

where $$j_k = \arg \min_{j \in F} d_{jk}$$

can be found by the minimal-link selection process described above (i.e. node k in stage 3 will be connected to node $j_k$ in stage 2 via the link that has the smallest cost among all possible links). The first summation of C(F) includes all links from node i to nodes in F. However, it is possible for some nodes in F not to be used, because the arcs from them to nodes in K' are not minimal. Therefore, C(F) is the unadjusted cost: the adjusted cost has $c_{ij}$ deducted from the unadjusted cost for any node j that is not used. This distinction, however, is not important if one considers all $2^m$ subsets of intermediate nodes as candidates for F in the optimization process, since there is an optimal candidate in which all nodes in F are used. Therefore, when comparing different solutions in our optimization process, one needs to concentrate only on the unadjusted cost.

Given the above definition, one has the following theorem relating the unadjusted costs of four alternative proposals:

Theorem 1

Consider two subsets of the second-stage nodes S and T, where $S \subset T$, and a node $h \notin T$. Then, $C(S) - C(S \cup \{h\}) \geq C(T) - C(T \cup \{h\})$.

The validity of the theorem is seen in simple and intuitive terms. The cost savings due to the inclusion of node h in node set S and node set T are $C(S) - C(S \cup \{h\})$ and $C(T) - C(T \cup \{h\})$, respectively. Since $S \subset T$, as far as the costs of the arcs from stage 2 to stage 3 are concerned, the solution with S as the proposed nodes is less optimized than the solution with T as the proposed nodes. Therefore, adding node h to S is likely to achieve more cost saving than node h to T.

Proof

The left-hand side of the inequality is:

$$C(S) - C(S \cup \{h\}) = c_{ih} + \sum_{k \in K'} (d_{j_k k} - d_{hk})^+ \quad (2)$$

where $$J_k = \arg \min_{j \in S} d_{jk} \text{ and } (x)^+ = \max(0, x).$$

Similarly, the right-hand side of the inequality is:

$$C(T) - C(T \cup \{h\}) = c_{ih} + \sum_{k \in K'} (d_{j'_k k} - d_{hk})^+ \quad (3)$$

where $$j'_k = \arg \min_{j \in T} d_{jk}.$$

Clearly, $$d_{j'_k k} \geq d_{j_k k}$$

since $S \subset T$. Hence, equation (2) $\geq$ equation (3).

The above theorem is used as the basis of the solution-trimming process.

Optimal Algorithm: Enumeration-Tree Trimming Scheme

Consider an arbitrary node in the enumeration tree in FIG. 4 where the switch modules are distributed into the three sets F, G, H defined above. If a module is selected from H and put into F and G, the enumeration process branches off in two different directions. In FIG. 4, the particular module in H that is selected is fixed at each level. For instance, module 0 and 1 are considered to be at the first and second levels, respectively.

The enumeration process is modified slightly by letting the module chosen be a variable. The test discussed hereinbelow can be used to determine whether, given the current status of F and G, one can eliminate one of the two branches without missing the optimal solution.

Test For Trimming Enumeration Tree

1. Choose each module $h \in H$ successively until all modules in H have been considered. For each h, compute $C(F \cup H)$ and $C(F \cup H - \{h\})$. If $C(F \cup H - \{h\}) > C(F \cup H)$, move h from H to F; one will not miss the optimal solution by not considering the branch with h in G.

2. Choose each module in $h \in H$ successively until all modules in H have been considered. For each h, compute $C(F)$ and $C(F \cup \{h\})$. If $C(F \cup \{h\}) > C(F)$, move h from H to G; again, one will not miss the optimal solution by not considering the branch with h in F.

If both of the tests above do not succeed in moving any module from H to F or G, then trimming is not possible, and one must branch off in two directions by moving a module from H to both F and G.

To see how the first test works, substitute T in Theorem 1 with $F \cup H - \{h\}$. If $C(F \cup H - \{h\}) - C(F \cup H) = C(T) \cup \{h\}) > 0$, then $C(S) - C(S \cup \{h\}) > 0$ for all $S \subset T$ according to Theorem 1. One can interpret S as the proposed modules of an arbitrary leaf node belonging to the branch of the enumeration node where h is put into G. The above result says that there is a leaf node in the other branch which achieves lower cost by having h in addition to S as the proposed nodes. Thus, given the current status of F, G, and H, one will not miss enumerating the optimal solution if one only branches in the direction where h is in F. Similar reasoning applies to the second test by substituting S in Theorem 1 with F.

Finally, as previously mentioned, if $|K'| < m$ (i.e., there are fewer than m stage-3 switch modules in the multicast connection), at most $|K'|$ stage-2 switch modules are used. One can incorporate another test at each node of the enumeration tree: if $F=|K'|$, branch no more; this node is taken as one of the proposals to be examined below. This test can, substantially reduce the computation needed if $|K'| \ll m$.

Appendix 2 outlines an algorithm that makes use of the above tests in a recursive and efficient way in Pidgin Algol.

Heuristic Algorithm 1: 3-Step Augmentation Scheme

Figure 5A:
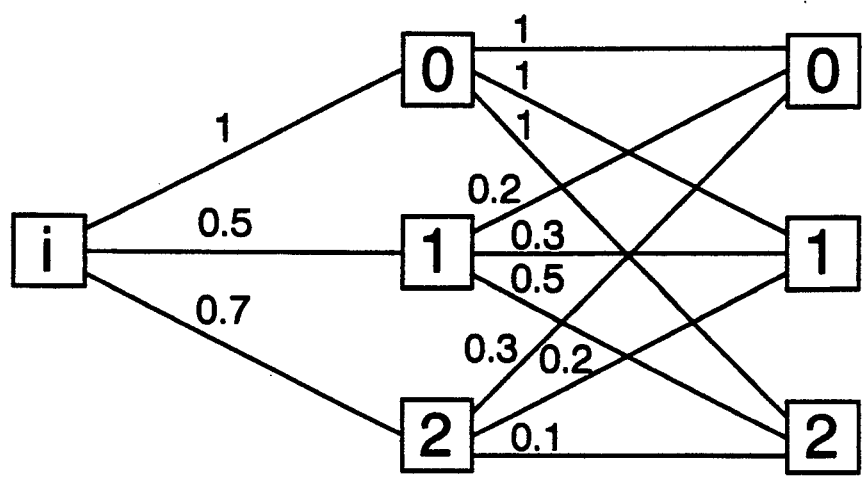
FIGS. 5a through 5d are schematic diagrams illustrating costs for various paths of multicast trees and utilizing a heuristic algorithm.

The run time of the optimal algorithm can be excessive in the worst case. Considered herein is a heuristic algorithm that attempts to find a solution that is close to optimal but within a shorter time. It consists of three procedures running in sequence, each improving on the solution given by the previous procedure. FIGS. 5a through d is an example for simple illustration of the heuristic algorithm with FIG. 5a showing arc cost in full graph. Also, since all $2^m$ subsets of intermediate nodes in our optimization process are not considered here, the adjusted cost is concentrated upon when comparing different solutions.

3-Step Augmentation Algorithm

Figure 5B:
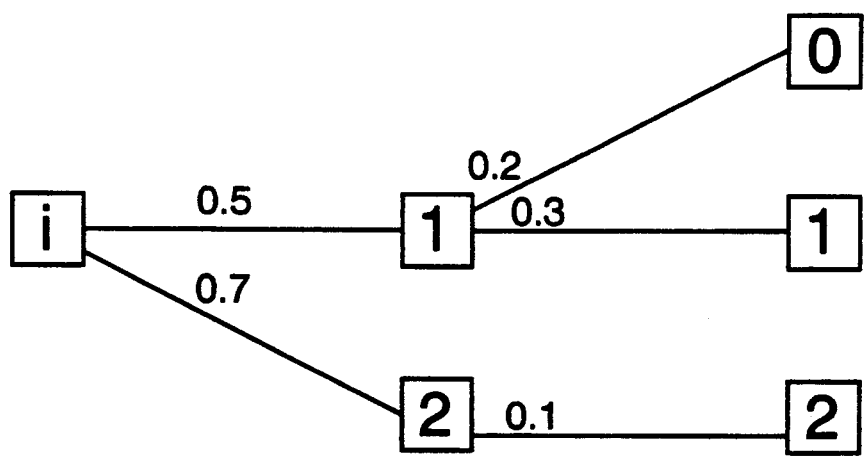
Figure 5C:
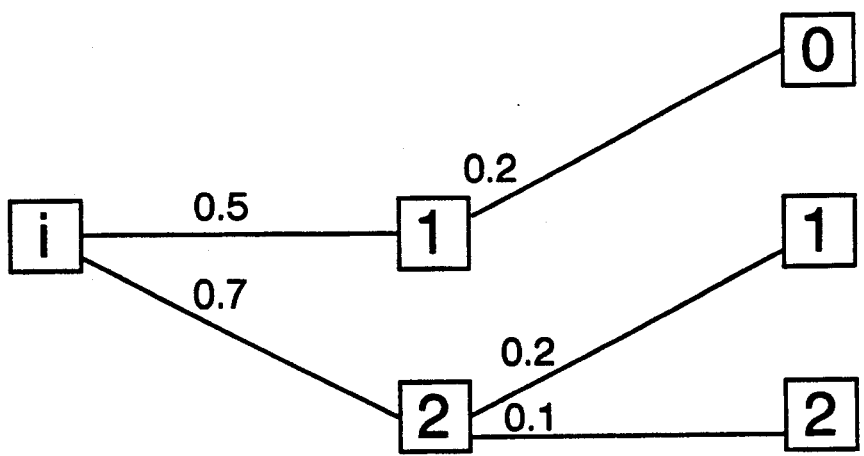

1. Find the shortest-path solution. That is, for each node $k \in K'$, find $j_k = \arg \min_{j \in J} c_{ij} + d_{jk}$, and make links $(i,j_k)$, $(j_k,k)$ and node $j_k$ part of the multicast tree. This would be the "optimal" solution if all individual paths in the multicast connection were to be optimized as disclosed in the previous section. FIG. 5b illustrates the multicast tree after the search in the shortest-path tree.
2. Find a new multicast tree as follows. Denote the intermediate switch modules used in the shortest-path solution by V. Find the set of minimal links from node set V to node set K' using the minimal-link selection process based on V. That is, for each $k \in K'$, find $j_k = \arg \min_{j \in V} d_{jk}$, and make links $(i,j_k)$, $(j_k,k)$ and node $j_k$ part of the multicast tree. Remove nodes from V that are not part of the resulting multicast tree. FIG. 5c illustrates the multicast tree after optimization based on V.
3. For each node $v \in V$, denote the set of third-stage nodes attached to it in the multicast tree by $W_v$. See if these nodes can be attached to other nodes in V at a net cost saving. The original cost associated with the subtree of node v is $$c_{iv} + \Sigma_{w \in W_v} d_{vw},$$

and the cost associated with attaching the nodes in $W_v$ to other nodes in V is $$\Sigma_{w \in W_v} \min_{j \in V-\{v\}} d_{jw}.$$

Figure 5D:
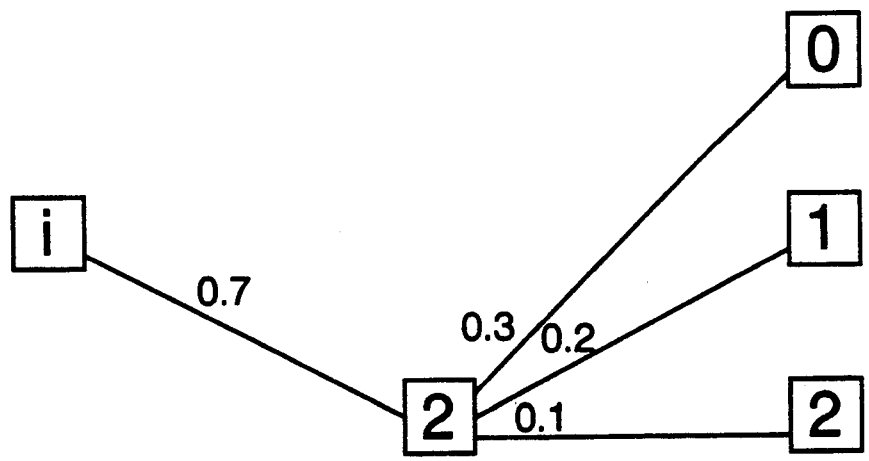
Figure 6A:
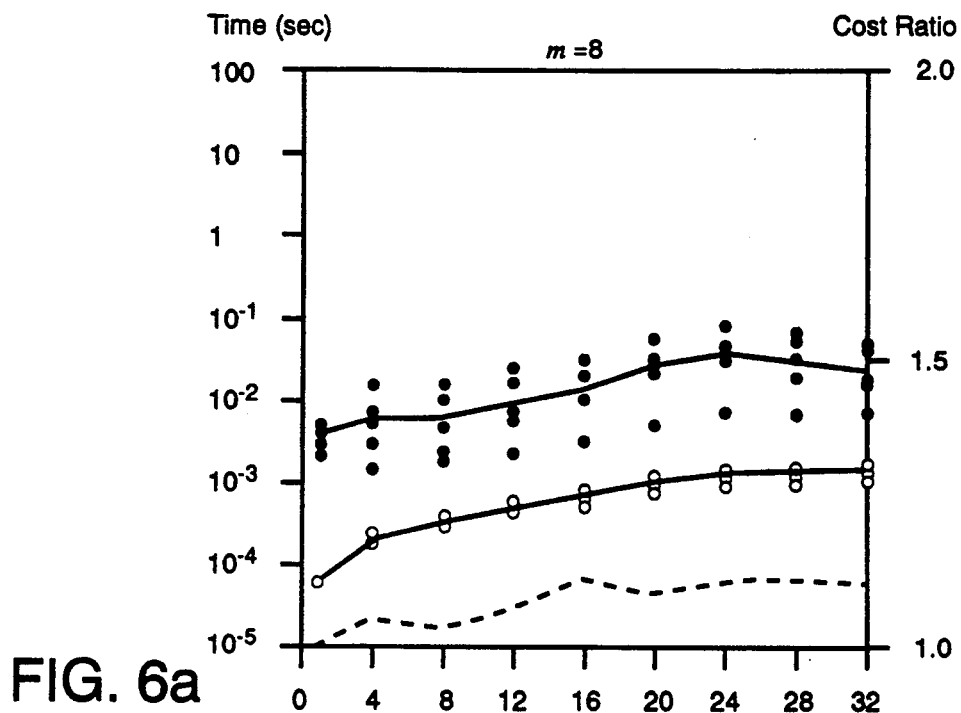
FIGS. 6a through 6d are graphs comparing run time and heuristic-to-optimal cost ratio versus the number of end nodes for m=8, 16, 32 and 64, respectively.
Figure 6B:
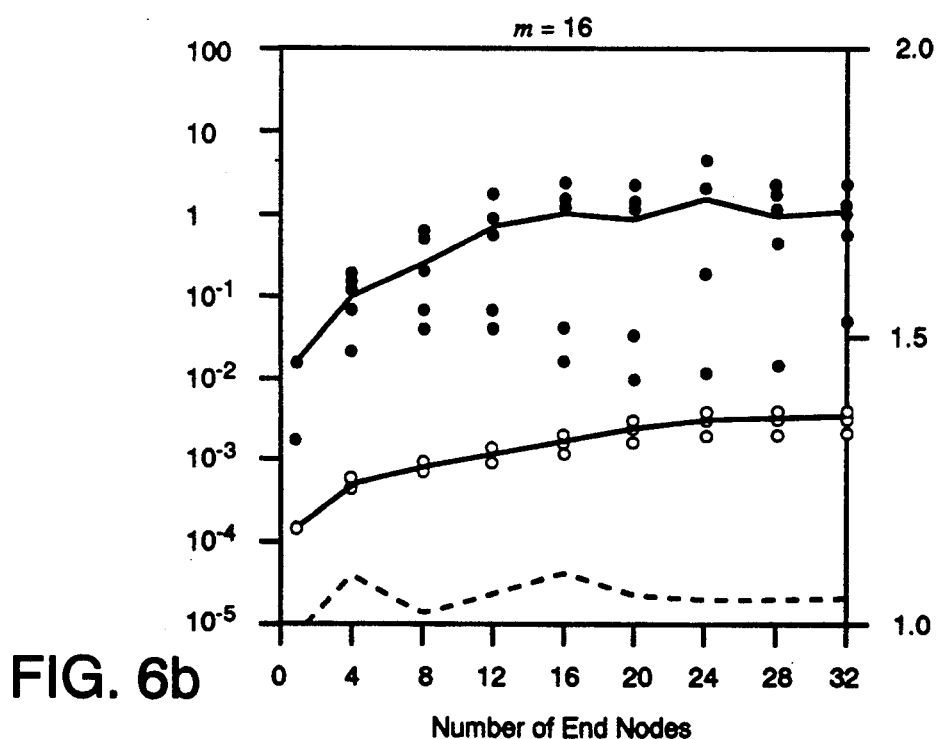
Figure 6C:
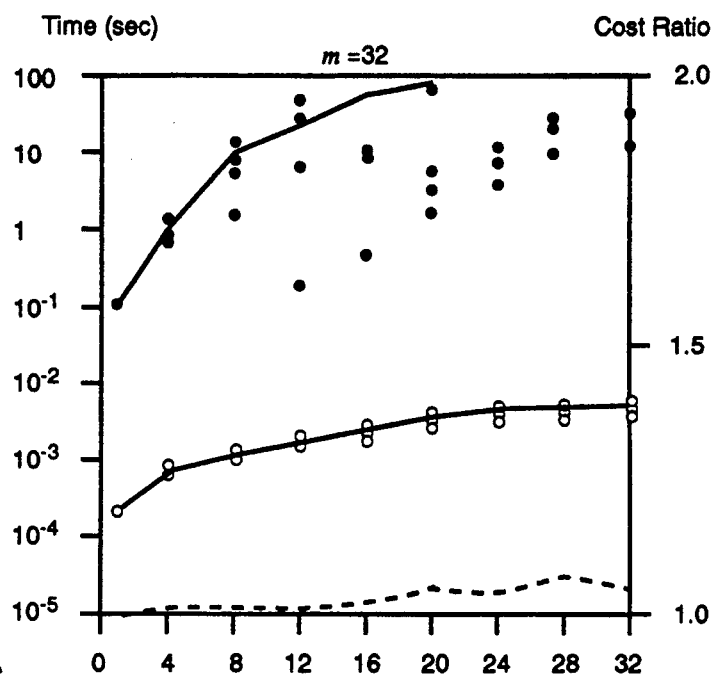
Figure 6D:
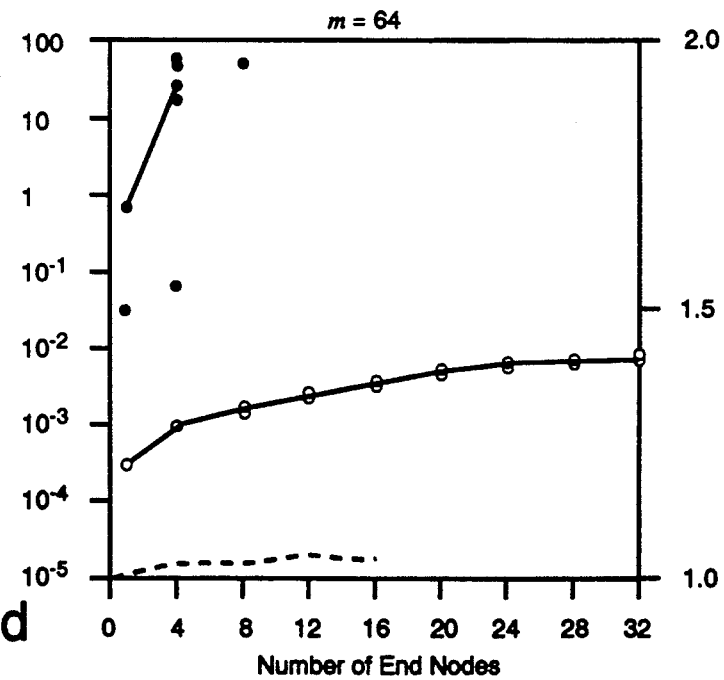
Figure 7A:
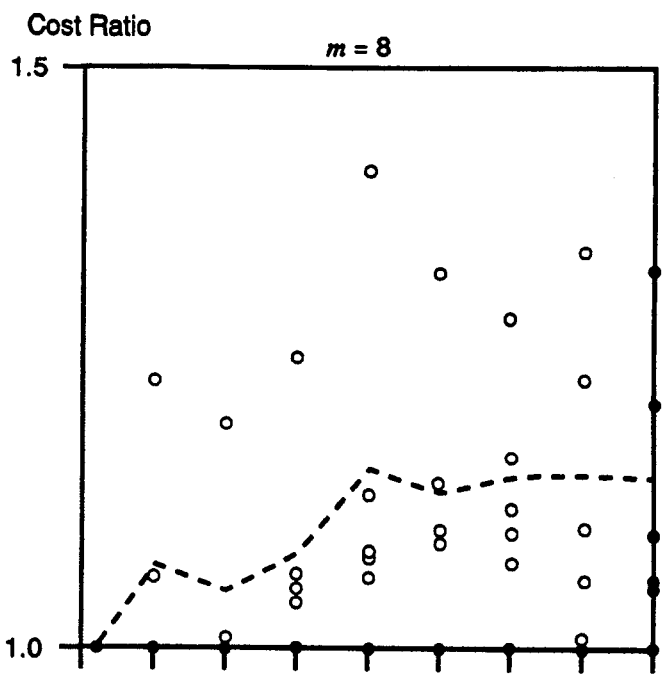
FIGS. 7a through 7d are graphs comparing heuristic-to-optimal cost ratios for two heuristic algorithms.
Figure 7B:
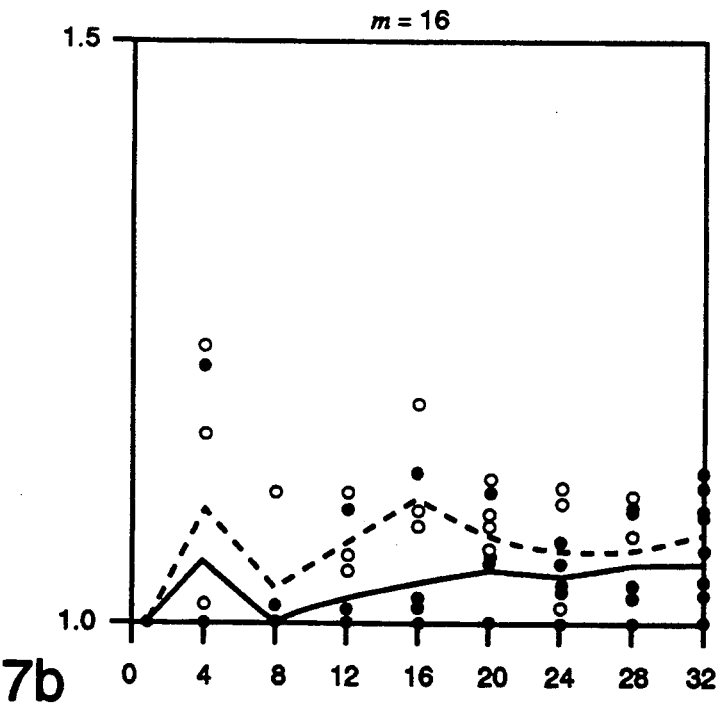
Figure 7C:
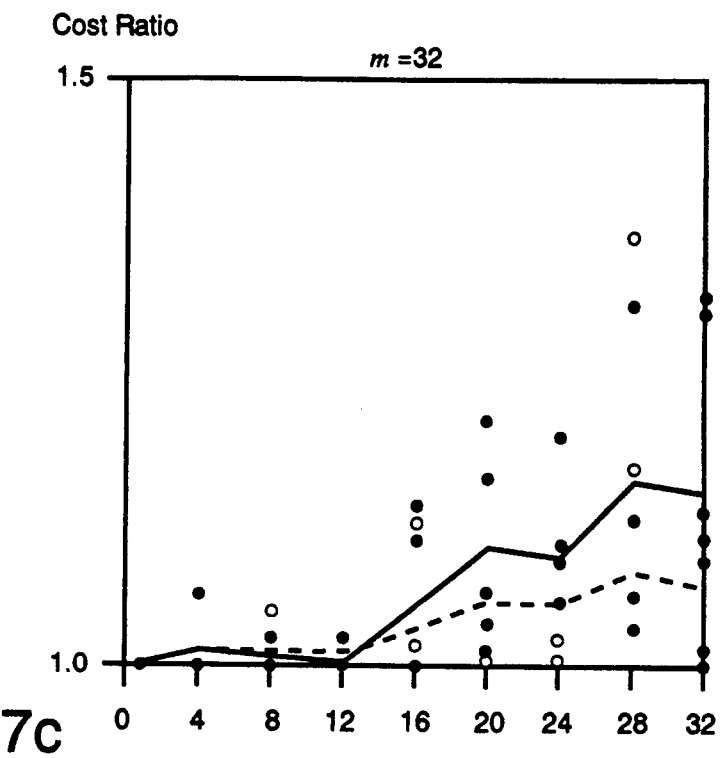
Figure 7D:
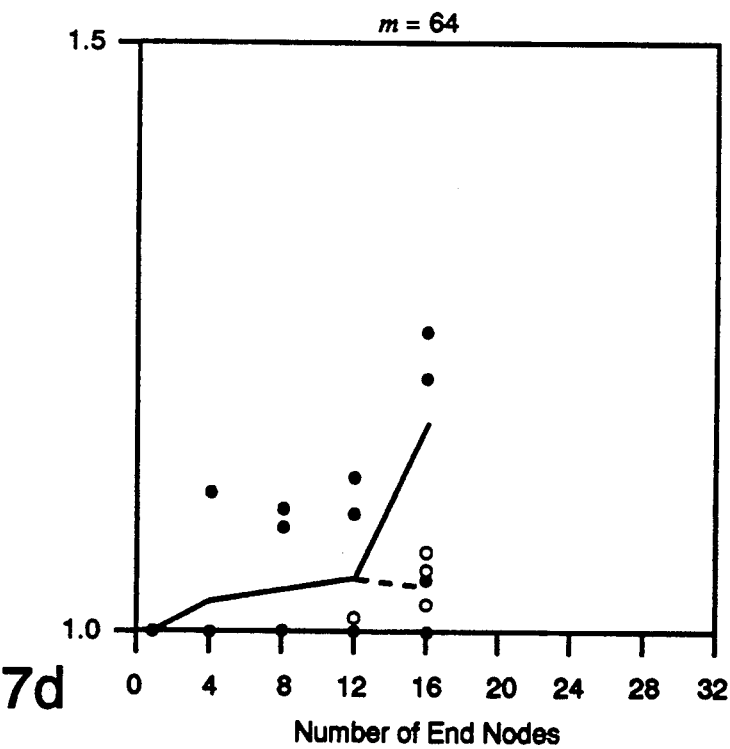

If $$c_{iv} + \Sigma_{w \in W_v} d_{vw} - \Sigma_{w \in W_v} \min_{j \in V-\{v\}} d_{jw} > 0,$$

then saving can be achieved; remove v from V and attach nodes in $W_v$ to the other nodes in V. FIG. 5d illustrates the multicast tree after the "trim-and-graft" operation.

The 3-step augmentation scheme can be very good if the shortest-path solution in the first step already yields very good results, or the intermediate modules used in the shortest-path solution overlap substantially with those used in the optimal solution.

Heuristic Algorithm 2: Intermediate-Module Limiting Scheme

The second heuristic algorithm is based on the observation that if there were only a few intermediate modules in the Clos network (i.e., m is small), the optimal algorithm would terminate within a short run time. Therefore, in cases where m is large, one can devise a heuristic algorithm by intentionally removing some intermediate modules from consideration, as long as one was willing to give up absolute optimality. That is, one considers only m' of the m modules as candidates for use in the multicast tree, and the enumeration process in the optimal algorithm is modified so that the root enumeration node has only these m' intermediate modules in H. There are $$\binom{m}{m'}$$

ways of choosing the m' modules. By judiciously selecting one of the choices, one can maximize the probability of finding a good solution. The algorithm below chooses the m' modules based on those used in the shortest-path solution.

Intermediate-Module Limiting Algorithm

1. Find the shortest-path solution.
2. Denote the intermediate nodes used in the shortest-path solution by V. If $|V|<m'$, one needs another $m'-|V|$ modules. Select from modules not already in V those that have the least first-stage link costs $c_{ij}$'s. If $|V|>m'$, one has too many modules. Remove from V those modules that have the highest link costs $c_{ij}$'s.
3. Start the enumeration-tree trimming algorithm (see the optimal algorithm) with the m' chosen modules in H, and $F=G=\phi$.

$|V| \leq m'$, this algorithm yields a solution that is at least as good as the one given by the 3-step augmentation algorithm. Otherwise, the 3-step augmentation algorithm may give a better solution.

Computation Results

The optimal and heuristic algorithms have been coded in C language and implemented on a SPARC 2 work station, a RISC (reduced-instruction set computing) machine with 28.5 MIPS (million instructions per second) processing power. It is assumed in the discussion that a response time of no more than 0.1 second is required. From the viewpoint of the end-users, a call setup time of less than a few seconds is probably desirable. Since the algorithm resides in only one switching node, and is one of the many functions that must be performed by the overall network, it is sound engineering practice to have a more stringent requirement on the run time. A more conservative approach is also necessary to compensate for the communication overhead between different layers of functionalities and the computation of other network algorithms that share the same computing resources.

To test the algorithms, experiments have been conducted in which the problem of multicasting from node i in stage 1 to $d(d \leq p)$ in stage 3 is considered, assuming there are m stage-2 nodes in the Clos switching network. The details are as follows:

Experimental Step

The arc costs were created with a pseudorandom number generator which generates numbers uniformly distributed from 0 to 1. Five sets of random arc costs were generated to run five independent experiments for each multicast connection. Based on these data points, the sensitivity of the algorithms to arc costs were studied.

The run time and the cost of the solution given by each algorithm were taken. The ratio of the heuristic cost to the optimal cost was calculated to measure the "goodness" of the heuristic algorithms.

The heuristic algorithm 1 was first compared with the optimal algorithm. As illustrated in FIGS. 6a through 6d, run time (the left y-axis) and heuristic-to-optimal cost ratio (the right y-axis) is plotted versus number of end nodes, d, for four values (m=8,16,32, and 64, respectively). Both the individual run times (• for the optimal algorithm and o for heuristic algorithm 1) and the average run time of five data points (solid line) are shown. Only the average cost ratio is plotted (dashed line). From the graphs, one can make the following observations and recommendations about the Clos network.

Observations and Recommendations

Run time of the optimal algorithm—For $m \leq 8$, the optimal algorithm satisfies the criterion of 0.1s response time. The optimal algorithm is very sensitive to the m value. For $m \geq 16$, the average run time of the optimal algorithm is not satisfactory, although individual run times in certain cases of m=16 fall within the limit. The run times of different data points (with different arc costs) of the same multicast parameter values can differ significantly. For instance, for m=16, the difference can be close to three orders of magnitude. This is attributed to the solution-trimming process of the algorithm. Trimming is most effective in the early stage of enumeration. If the arc costs are such that a large number of branches can be eliminated in the beginning, then a significant fraction of alternative solutions can be eliminated from consideration. On the other hand, if the arc costs do not allow for substantial trimming at the outset, even if branches are cut later, chances are the algorithm will still take a long time. The graphs of FIGS. 6a through 6d also show that for each m, run time generally increases with the number of end nodes, d, although it tends to taper off after a certain point. Overall, the run time is much more sensitive to m then to d.

Run time of heuristic algorithm 1—The run time of this heuristic algorithm in all cases satisfy our criterion of 0.1s response time. Furthermore, it is much less sensitive to m than the optimal algorithm is. Consequently, for large $m \geq 16$, the run time of the heuristic algorithm can be several orders of magnitude better than the optimal algorithm. In addition, the heuristic algorithm is also much less sensitive to the arc costs, and it is highly dependable as far as meeting the response-time limit is concerned.

Cost ratio—The average heuristic-to-optimal cost ratio is very close to 1.0 on the whole, and never exceeds 1.15. What makes heuristic algorithm 1 even more interesting is that for large m, when the run time of the optimal algorithm is long, the average cost ratio quite timely becomes closer to 1.0.

Implication of parallel computing—The optimal algorithm can be parallelized quite easily. Each time the enumeration process branches off in two directions, computation on each branch can be assigned to a separate processor. Nevertheless, even with 100 processors, the reduction in run time is at most two orders of magnitude. Although parallel computing may help when m is small, it will not solve the problem for $m \geq 64$.

Implication of time-limit interrupts—The optimal algorithm can easily be modified to store the best solution computed so far. With this change, the algorithm can be interrupted when the time limit of 0.1s is reached. This gives us a feasible, albeit possibly non-optimal, solution.

Implementation strategy—For small networks (say networks with less than 32 intermediate nodes) the response time of the optimal algorithm in some cases is no more than an order of magnitude larger than that of the heuristic algorithm. The use of the optimal algorithm should be considered for these cases. One can adopt a strategy in which the optimal and heuristic algorithms are run in parallel with a set time limit. When time is up, the better solution offered by the two algorithms is chosen.

Based on further experimentation, one finds that the optimal algorithm can usually meet the response time limit if $m \leq 12$. When the second heuristic algorithm is tested, assuming m'=8, its run time is comparable to the optimal algorithm's run time with m=8, since it is founded on modification of the optimal algorithm in which the number of intermediate nodes being considered is limited to m'. However, whereas the optimal algorithm's run time grows with m value, the heuristic algorithm's run time does not. To compare the two heuristic algorithms, FIGS. 7a through 7d plots heuristic-to-optimal cost ratio versus number of end nodes for both algorithms. Both the individual cost ratios (○ for heuristic algorithm 1 and • for heuristic algorithm 2) and the average cost ratios of five data points (dashed line for heuristic algorithm 1 and solid line for heuristic algorithm 2) are shown.

More Observations and Recommendations

Effects of m and d—Heuristics algorithm 2 is better than heuristic algorithm 1 for $m \leq 16$. For m=32, heuristic algorithm 2 is still better on the average when the number of end nodes, d, is less than 16; otherwise, heuristic algorithm 1 is better. For m=64, heuristic algorithm 1 is better. These observations are attributed to the fact that the number of intermediate modules used in the shortest-path tree solution is less than m'=8 when m and d are small, and larger than m'=8 when m and d are large. Further experimentation confirmed the expectation that increasing m' value improves the solutions found by the second heuristic algorithm, at the expense of longer run time.

Implementation strategy—Combining these observations with the previous observations, the following strategy is suggested. For m<32, run the optimal algorithm, heuristic algorithm 2 with m'=10, and heuristic algorithm 1 in parallel with a set time limit. For higher m values, run heuristic algorithm 2 with m'=12 and heuristic algorithm 1 in parallel with a set time limit. These quantitative recommendations assume a particular computing environment and a particular response time requirement. Perhaps the more important observation is the qualitative fact that each of the algorithm has its own regime of operation, and which one or which combination to use depends largely on the switch parameters, the response time requirement, and the computing power available.

Conclusions

One of the approaches to building a large ATM switch is to simply set up a regularly-structured network in which smaller switch modules are interconnected. To meet the grade-of-service and reliability requirements, there are typically many alternative paths from any input to any output in a such a switching network. This means that routing, or the choice of routes, must be considered to achieve good performance. Multicast connections will be an important service in the future. Multicast routing in 3-stage Clos networks to find out if routing will be a bottleneck to call setup is disclosed herein.

The multicast routing problem can be formulated as a warehouse-location problem. This formulation achieves global optimality as opposed to local optimality obtained with the shortest-path tree formulation. One optimal and two heuristic algorithms are disclosed herein. The optimal algorithm is centered on a procedure which eliminates a large number of non-optimal solutions from consideration without computing them, thereby achieving a substantial reduction in run time.

The first heuristic algorithm is based on a three-step optimization process in which each step attempts to improve on the solutions found by the previous steps.

The second heuristic algorithm is founded on a modification of the optimal algorithm in which the second-stage switch modules being considered for use in the multicast connection is limited to a subset of all the available second-stage modules. Major observations and implications of the work are summarized below.

1. Computation experiments show that the heuristic algorithms can find multicast routes that are close to optimal within an average response time that is several orders of magnitude lower than that of the optimal algorithm. Compared with the optimal algorithm, the response times of the heuristic algorithms do not increase as much with the network size. In addition, the response time of the first heuristic algorithm is also relatively insensitive to the values of arc costs.
2. For large networks (i.e. networks with more than 32 nodes at stage 2), the response time of the optimal algorithm can exceed the targeted 0.1s by several orders of magnitude. Even with a more powerful processor (i.e. 100 MIPS) than the one used in the experiments, the response time will still not be satisfactory. For small networks (i.e. networks with less than 32 intermediate nodes), the run time of the optimal algorithm in some cases is no more than an order of magnitude larger than that of the heuristic algorithm. The use of the optimal algorithm should be considered in these cases.
3. By modifying the optimal algorithm to store the best solution computed so far, one can have a hybrid strategy in which the optimal and heuristic algorithms are run in parallel. When a set time limit is reached, the better solution offered by the algorithms is chosen.
4. The need for a sophisticated routing procedure in itself does not rule out the Clos network as a viable choice for a switch architecture. If the network can also be designed to meet other requirements, such as grade-of-service and fault tolerance requirements, without complex control mechanisms, then it is a serious candidate for a future broadband switch.

Although motivated by the Clos switching network, the algorithms of the present invention and the discussion here also apply to large-scale communications networks with a two-hop structure. It is likely that facility cross-connects will be used to configure future ATM networks into very simple logical network structures in order to facilitate control and increase reliability. It is undesirable from a control standpoint to have too many stages of queues between two nodes. The present invention is especially relevant to logical networks in which two nodes are directly connected via a set of logical paths, and indirectly connected via another set of two-hop logical paths, with each involving only one intermediate switching node.

While the best mode for carrying out the invention has been described in detail, those familiar with the art to which this invention relates will recognize various alternative designs and embodiments for practicing the invention as defined by the following claims.

APPENDIX 1

Warehouse Location Problem Formulation

Let the three sets of nodes at stage 1, stage 2, and stage 3 be I, J, and K, respectively. Furthermore, denote the weight of the arc from node $i \in I$ to node $j \in J$ by $c_{ij}$, and that from node $j \in J$ to node $k \in K$ by $d_{ji}$. Suppose that one want to multicast from node $i \in I$ to nodes $K' \subseteq K$. Then, the problem can be cast as:

$$\min \sum_{j \in J} \left( c_{ij} x_{ij} + \sum_{k \in K} d_{ij} y_{jk} \right)$$

subject to $$\sum_{j \in J} y_{jk} = 1 \text{ for all } k \in K'$$

$$x_{ij} \geq y_{jk} \; \forall \text{ all } j \in J, k \in K'$$

$$x_{ij}, y_{jk} = 0 \text{ or } 1 \text{ for all } j \in J, k \in K'$$

where $x_{ij}$ (or $y_{jk}$) is 1 if arc (i,j)(or arc (j,k)) is part of the multicast tree and 0 otherwise. This is known as the warehouse location problem in the Operations Research community. The idea is to select the optimal warehouse locations (corresponding to the selected second-stage nodes) for the delivery of some commodity to a set of destinations (corresponding to the third-stage end nodes).

---
Appendix 2:
Algorithm For Exact Solution To Multicast Routing
---

```
main (E)
begin
    F = ∅
    H = E;
    expandF(F,H);
    expandFG(F,H,2);
    enumerate(F,H);
end
function enumerate(F,H);
begin
```

-continued

Appendix 2:
Algorithm For Exact Solution To Multicast Routing

```
(comment: the following enumerates solutions at the next
level).
        if H≠∅ or |F| < |K'| do
        begin
                choose an element h from H;
                H':=H − {h};
                F':=F ∪ {h};
                H:=H';
(comment: note that the memory space for F' and H' is
allocated locally, whereas the memory space for F and H
is allocated from the calling routine although the
content of H is modified by this function; each invoca-
tion of the function "enumerate" gets a fresh set of F'
and H'.)
                expandFG(F',H',2); enumerate (F', H')
                expandFG(F,H,1); enumerate(F,H);
(comment: branch off in two directions, one with h in
F, one with h in G.)
        end
end
function expandFG(F,H,flag)
begin
        while flag ≠ 0 and H ≠ ∅ do
        begin
                if flag = 1 do flag := expandF(F,H)
                else flag := expandG(F,H);
        end
end
function expandG(F,H)
begin
(comment: the following attempts to expand G by moving
elements from H to G.)
        C := cost(F);
        flag := 0;
        for all h ε H do
        begin
                D := cost(F ∪ {h});
                if D > C do
                begin
                        H := H − {h};
                        flag := 1;
                end
        end
        return flag;
end
function expandF(F,H)
begin
(comment: the following attempts to expand F by moving
elements from H to F.)
        C := cost (F ∪ H);
        flag := 0;
        for all h ε H do
        begin
                D := cost (F∪H − {h});
                if D > C do
                begin
                        F := F ∪ {h};
                        H := H − {h};
                        flag := 2;
                end
        end
        return flag;
end
```

What is claimed is:

1. In a network including a multicast tree having a plurality of nodes interconnected by links, the plurality of nodes including a source node, multiple end nodes and multiple intermediate nodes, a method for determining optimal routes from the source node to the plurality of end nodes, the method comprising the steps of: assigning a weight to each link of tree, each weight representing a traffic congestion level on the link; and, minimizing the combined total of link weights from the source node to the multiple end nodes to determine the optimal routes.

2. The method of claim 1 wherein the step of minimizing is at least partially accomplished by an optimal algorithm which utilizes a trimming procedure.

3. The method as claimed in claim 1 or claim 2 wherein the step of minimizing is at least partially accomplished by at least one heuristic algorithm which restricts the solution space to a subset of all possible solutions.

4. The method as claimed in claim 1 wherein the network is a communication network.

5. The method as claimed in claim 1 wherein the network is a switching network.

6. The method as claimed in claim 5 wherein the network is a Clos switching network.

7. The method as claimed in claim 1 wherein the step of minimizing is at least partially accomplished by an optimal algorithm which utilize a trimming procedure and the step of minimizing is at least partially accomplished by at least ne heuristic algorithm which restricts the solution space to a subset of all possible solutions and wherein the optimal algorithm and the at least one heuristic algorithm operate in parallel.

8. A system for determining optimal multicasting routes in a network including a multicast tree having a plurality of nodes interconnected by links, the plurality of nodes including a source node, multiple end nodes and multiple intermediate nodes, the system determining optimal routes from the source nodes to the multiple end nodes, the system comprising:

means for assigning a weight to each link of the tree, the weight of each link representing a traffic congestion level on the link; and means for minimizing the combined total of all link weights from the surface node to the multiple end nodes to determine the optimal routes.

9. The system of claim 8 wherein the means for minimizing includes means for performing an optimal algorithm which utilizes a trimming procedure.

10. The system as claimed in claim 8 or claim 9 wherein the means for minimizing includes means for performing at least one heuristic algorithm which restricts the solution space to a subset of all possible solutions.

11. The system as claimed in claim 8 wherein the network is a communication network.

12. The system as claimed in claim 8 wherein the network is a switching network.

13. The system as claimed in claim 12 wherein the network is a Clos switching network.

14. The system as claimed in claim 8 wherein the means for minimizing includes means for performing an optimal algorithm which utilizes a trimming procedure and means for performing at least one heuristic algorithm which restricts the solution space to a subset of all possible solutions and wherein the optimal algorithm and the at least one heuristic algorithm operate in parallel.

* * * * *